INVENTOR.
E.H.Greibach

INVENTOR.
E.H. Greibach

FIG.5

April 20, 1965  E. H. GREIBACH  3,179,886
ELECTRIC CURRENT MEASURING DEVICE WITH COIL DEFLECTION
STOPS AND SHUNTING DIODE OVERLOAD PROTECTION
Filed May 4, 1961  5 Sheets-Sheet 4

*INVENTOR.*
E.H. Greibach

April 20, 1965   E. H. GREIBACH   3,179,886
ELECTRIC CURRENT MEASURING DEVICE WITH COIL DEFLECTION
STOPS AND SHUNTING DIODE OVERLOAD PROTECTION
Filed May 4, 1961   5 Sheets-Sheet 5

INVENTOR.
E.H.Greibach
BY
ATTORNEYS

United States Patent Office

3,179,886
Patented Apr. 20, 1965

3,179,886
ELECTRIC CURRENT MEASURING DEVICE WITH COIL DEFLECTION STOPS AND SHUNTING DIODE OVERLOAD PROTECTION
Emil H. Greibach, 315 North Ave., New Rochelle, N.Y.
Filed May 4, 1961, Ser. No. 119,758
13 Claims. (Cl. 324—110)

This application is a continuation-in-part of my copending application Serial No. 20,122, filed April 5, 1960 (now abandoned) and relates to electric current measuring instruments or devices having a rotatable coil which is deflected by the measured direct current passing therethrough for indicating on their scales the magnitude of the measured current. Such measuring instruments or meters have as a rule range stops which limit deflection of the meter coil at the opposite ends of its full-scale deflection range.

Such current meters have been subject to coil damage caused by the impact shocks between their coil and at least one of their coil stops when the coil is subjected to a high-speed deflection by an overload suddenly applied to the meter coil. There has long existed an urgent need for protecting such meters against coil damage when the meter coil hits and is subjected to shock by the coil stops without affecting the desired high meter accuracy.

Among the objects of the invention are electric current meters of the foregoing type, which prevent high-speed movement or deflection of the meter coil under sudden application of large overload currents, without in any way affecting their desired high meter accuracy. In accordance with the primary phase of the invention, a direct-current meter requiring a certain number of coil turns for measuring current, is provided with a rotatable meter coil having—in addition to the required number of measuring coil turns—an additional coil part with additional coil turns and a semi-conductor rectifier junction or diode which is connected across all meter coil turns, thereby providing the measuring coil part with a shunting by-pass consisting of the additional coil turns and the diode. The coil parts and diode circuit are so proportioned and designed that an increase of overload coil current in the measuring coil part will produce by dynamic generating action in all coil turns a voltage higher than the threshold voltage of the diode, thereby producing therein and its diode circuit an opposite coil current. As a result, the opposite coil currents flowing in the different coil parts of the meter coil under an applied overload will subject the meter coil to opposing coil torques the difference of which gives the meter coil only a low velocity and excludes damage of the meter coil by impact with its coil stops.

Based on the concept of this primary phase of the invention, is the broader phase of the present invention which takes advantage of the fact that high-sensitivity meters requiring meter coils with a large number of coil turns, such as 1000 coil turns or more, will, in the initial coil acceleration by an applied overload current generate dynamically in such meter coil a high coil voltage in excess of the threshold voltage of a shunting diode which is connected across all coil turns. At such high dynamically generated coil voltage higher than the diode threshold voltage, the shunting diode will provide a low resistance path for a large damping current of the meter coil which slows down the coil movement and assures that troublesome coil stop damage under overloads is minimized and eliminated.

Each phase of the invention utilizes the fact that the generally available semi-conductor rectifier junctions or diodes have a very high forward resistance of at least ½ megohm below a certain low threshold voltage thereof, so that such diodes may be connected in forward direction directly across and parallel to the meter coil, without affecting the accuracy and/or sensitivity of the meter. According to the broader phase of the invention, advantage is taken of the fact that when the meter coil, which has a relatively large number of coil turns, is speeded up by an applied overload current, such many-coil-turn coil will dynamically generate a relatively high coil voltage higher than the diode threshold voltage, thereby passing through the diode a large damping current which reduces the coil speed and minimizes or eliminates coil damage by the coil deflection stops.

The foregoing and other objects of the invention will be best understood from the following description of exemplifications thereof, reference being had to the accompanying drawings, wherein:

FIGURE 1-A is a simplified diagrammatic view of the meter of FIGURE 1;

FIGURES 6-A and 7-A are simplified diagrammatic views of the measuring devices shown in the diagrammatic views of FIGURES 6 and 7, respectively.

Although the present invention is of value in other current-measuring devices, its practical application will be explained herein in connection with direct-current measuring devices having a rotatable meter coil of the type used in D'Arsonval meter movements. In such meter a measuring coil is rotatably held within a strong magnetic field of an air gap of a magnetic core structure so that the meter coil is deflected by a deflection angle which gives an accurate indication of the measured current flowing through the meter coil. Some features of the invention have special significance for current meters wherein the meter coil is carried within the field gap by a bifilary suspension. Accordingly, practical exemplifications of the invention will be herein described in connection with current meters having bifilary coil suspensions, although the principles of the invention are generally applicable to any type of current-measuring device having other types of meter coil movements, such as mechanical coil pivots, or the like.

Figure 1:
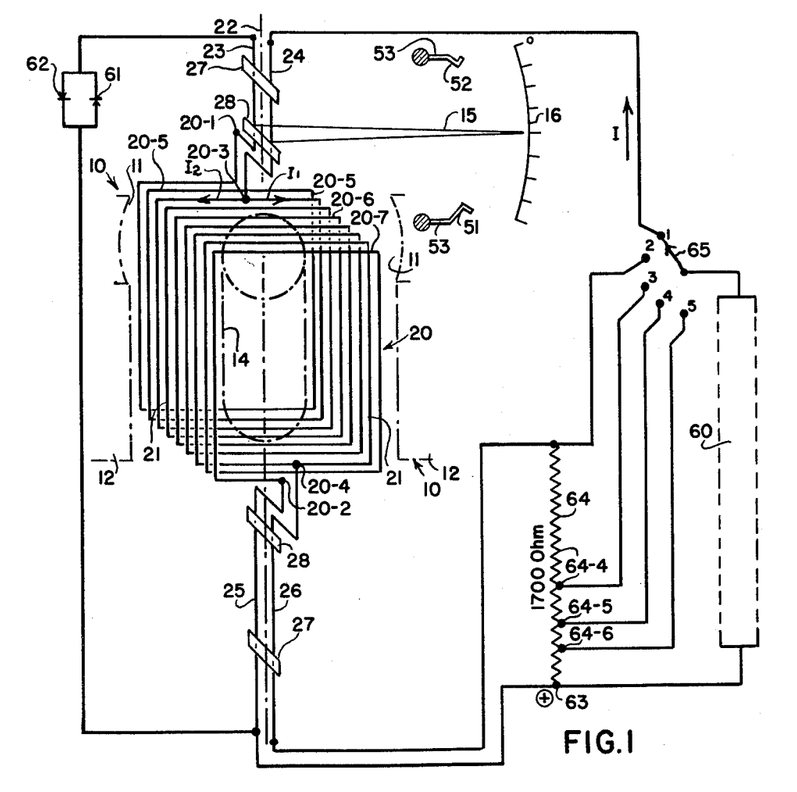
FIGURE 1 is a diagrammatic view of one form of current measuring device or meter exemplifying the invention.
Figure 2:
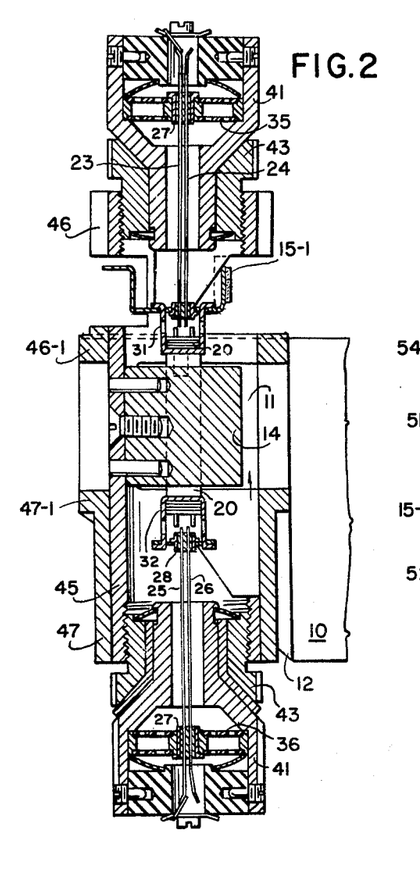
FIGURE 2 is a cross-sectional view of the principal parts of the coil movement portion of the meter shown diagrammatically in FIGURES 1 and 1-A.
Figure 3:
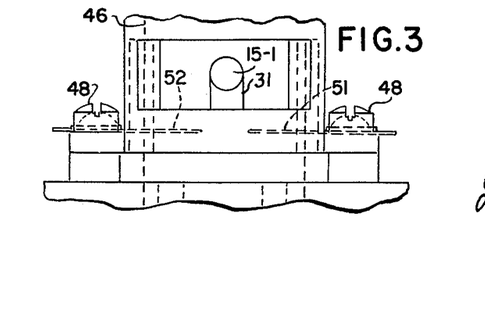
FIGURE 3 is a side view of a portion of the same meter, as seen from the left side of FIGURE 2.
Figure 4:
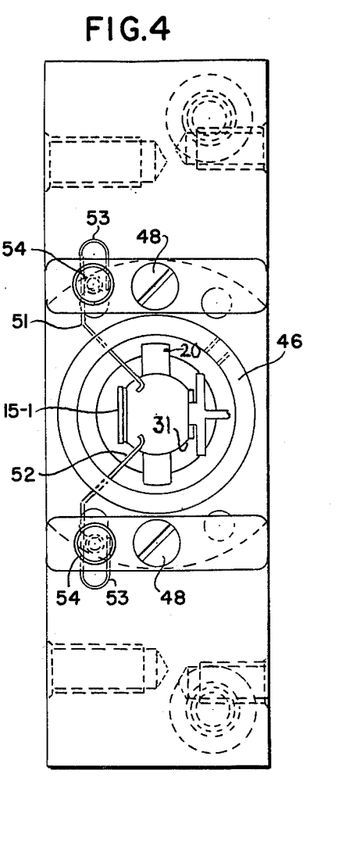
FIGURE 4 is a top view of a portion of the meter movement shown in FIGURES 2 and 3, with the upper part of the coil suspension unit removed.

FIGURES 1 and 1-A show diagrammatically, and FIGURES 2-4 one form of direct-current meter of the D'Arsonval type, described in more detail in U.S. Greibach Patents 2,562,183 and 2,882,497. The essential features of such current meters are also described in the published catalogue, "Greibach Precision Meters," of Greibach Instruments Corporation, copyright 1959.

The current meter of FIGURES 1-4 comprises a magnetic core structure 10 (shown in dash lines in FIGURE 1) for producing a unidirectional magnetic flux in two arcuate air gaps 11 within which the two opposite sides 21 of a meter coil 20 are arranged to be deflected or rotated around a central axis shown by dash-dot-line 22. The magnetic core structure is of conventional type, and has a field-inducing permanent magnet with two pole pieces 12 which form with the intermediate central cylindrical core element 14 a substantially closed magnetic circuit separated by the two air gaps 11 within which the two coil sides 21 are deflected to indicate the magnitude of the coil current flowing through the meter coil 20. The rotatably mounted meter coil 20 carries a pointer 15 for indicating on a scale 16 of a calibrated full-scale range, the magnitude of the current through the coil corresponding to the deflection imparted by the magnetic field in the air gap 11 to the measured current flowing through the coil 20. The meter pointer 15 may be either a light-beam or light pointer, or a mechanical pointer, the meter coil 20 of FIGURE 2 carrying a reflecting light pointer mirror 15–1.

The meter coil 20 may be mounted for deflecting rotary movement around its axis 22, by a conventional shaft and bearings, as in conventional direct-current meters, in which case conventional spiral biasing springs serve to return the meter coil to its normal or zero position to which it is biased. The meter coil 20 of the meter of FIGURES 1–4 is carried for rotary deflecting movement by two sets of tensioned bifilary suspension members comprising one set of two metallic suspension filaments 23 and 24, and an opposite set of two metallic suspension filaments 25, 26, having their inner filament ends secured to opposite transverse coil sides of meter coil 20. The outer ends of the upper set of suspension filaments 23, 24 (as seen in FIGURES 1 and 2) are insulatingly held and suitably supported under tension in outer anchor element 27 of an upper suspension structure 35 (FIGURE 2). The inner ends of the two upper suspension filaments 23, 24 are insulatingly held in a similar inner anchor element 28 which is affixed to and swings with the coil structure of the meter coil 20. The inner and outer ends of the opposite lower set of two suspension filaments 25, 26 are similarly held tensioned between a similar outer anchor element 27 suitably held on the lower coil suspension structure 36, and an inner anchor element 28 forming a fixed part of the coil structure of the meter coil 20.

The meter coil 20 shown in FIGURES 1, 1–A and 2–4, has two opposite coil end terminals 20–1, 20–2, and the coil has two additional intermediate coil taps 20–3, 20–4 at series conections which subdivide the meter coil turns into three distinct coil portions 20–5, 20–6, 20–7 (FIGURES 1, 1–A). The inner ends of the suspension filament 23 and of the lower suspension filament 25 are shown connected to the opposite end terminals 20–1, 20–2 of the meter coil, thereby providing circuit connections from the meter coil 20 to external circuits. The inner ends of the upper suspension filament 24 and of the lower suspension filament 26, are connected to the intermediate coil taps 20–3, 20–4 of the coil, whereby these two suspension filaments 24, 26 provide circuit connections from external circuits to the intermediate series connections between the several coil parts 20–5, 20–6, 20–7 of the meter coil 20.

Referring to FIGS. 1 and 2–4, the outer anchor elements 27 of the two sets of bifilary suspension filaments 23, 24 and 25, 26, are held suitably suspended by tensioning spring structures of a coil suspension unit, whereby the suspension filaments are biased under tension to control the movement of the meter coil and its pointer 15 over the full-scale range of the meter scale 16 and to return the pointer to the desired neutral or zero position on the scale 16. FIGS. 2–4 show, by way of example, structural details of one form of bifilary coil suspension for a meter coil 20 of the type indicated in FIG. 1. Each outer anchor element 27 and each inner anchor element 28 of each of the two bifilary suspension-member sets 23, 24 and 25, 26, is formed of a cylindrical metal sleeve filled with a hardened body of insulating cement within which the end regions of the respective adjacent metallic filaments 23, 24 and 25, 26 are embedded and affixed so as to be insulated from each other and from the surrounding metal sleeve. The upper and lower transverse coil sides of the meter coil 20 are held seated within generally U-shaped metallic saddle members 31, 32 of suitable non-magnetic material, such as aluminum. Each coil saddle 31, 32 has an outer saddle plate with a socket holding detachably fixed therein the respective inner anchor members 28 of the two sets of bifilary suspension filaments 23, 24 and 25, 26. The outer anchor elements 27 of the two sets of bifilary suspension filaments 23, 24, and 25, 26, are, respectively, connected to suspension spring structures 35, 36 which serve to hold the bifilary suspension filaments under relatively large tension. Each of the two opposite suspension spring structures 35, 36 is carried in its proper axially aligned position by two similar relatively rigid, opposite suspension heads 41. The two opposite spring suspension heads 41 are seated on respective opposite, rigid adjusting collars 43, which are held within opposite ends of a rigid mounting sleeve 45 which they form a self-supporting coil suspension unit by which the meter coil 20 is held under axial tension for controlling the coil deflection within the narrow air gap of the magnetic core 10.

The rigid mounting sleeve 45 which holds and forms with the meter coil 20 and all associated suspension elements the bifilary coil suspension unit 40, has also affixed thereto the intermediate magnetic core element 14 of the magnetic core structure 10. The two pole pieces 12 of the magnetic core structure 10 are joined to each other into a magnetic core assembly across their respective air gaps along the intermediate core element 14 by two cylindrical metallic frame collars 46, 47 having mounting flanges 46–1, 47–1, respectively, with which they are affixed to the assembled pole pieces, as by screws 48 (FIG. 4). Interior cylindrical seating surfaces of the two mounting collars 46, 47 are arranged to receive and hold in aligned position therein the mounting sleeve 45 of the bifilary coil suspension unit 40 so as to hold the meter coil 20 in the proper aligned position for deflection within the narrow magnetic-field air gap.

The meter of FIGS. 1–4 has a full-scale stop element 51 which stops the deflection of meter coil 20 at its full-scale deflection limit, and an opposite or return stop element 52 which stops the coil deflection when it moves or is returned to its opposite zero or return position, corresponding, for instance, to the zero position on meter scale 16 (FIG. 1). Each of the two deflection stops 51, 52 is usually made of elastically deformable material so that when the meter coil 20 is deflected with excessive speed to either end of its full deflection range, the respective stop, after being somewhat elastically deformed by the coil momentum, will stop the coil at its proper deflection limit as indicated on the scale 16. In the form indicated in FIG. 1, and shown in FIGS. 3 and 4, each of the two deflection stops 51, 52 is formed of an elastically deformable metal wire having an angularly bent end arranged to be engaged by relatively rigid upper socket member 31. An opposite end portion 53 of each coil stop wire 51, 52 is suitably affixed to the relatively stationary parts of the meter structure. As an example, the rear end 53 of each spring stop wire 51, 52 is U-shaped, and embraces the shank of clamping screw 54 with which it is held clamped to the underlying magnetic core structure 10. After calibrating and drawing the meter scale 16, the clamping screw 54 of the respective deflection spring stops 51, 52 is slightly loosened and after adjusting each such stop in accordance with the limits of the calibrated scale 16, the respective stop clamping screw 54 is firmly clamped in place for fixing the respective stops 51, 52 in their proper positions.

The coil structures of current meters, including those described above in connection with FIGS. 1–4, are frequently damaged by the impact shocks or forces with which the meter coil is accelerated against its coil deflection stops when an abnormal load current is suddenly applied to the meter coil.

According to the invention, the meter coil of any of the known current meters is protected against coil-shock damage under overloads, without having a large series-resistance in the circuit between the meter coil and the external measured circuit, and without reducing the desired high accuracy of the meter readings. According to a primary phase of the invention, a current meter operating with a rotatable meter coil having a certain number of measuring coil turns for a desired measuring current range, has its meter coil provided with additional coil turns or coil part, and a semi-conductor rectifier junction or diode is connected in shunt directly across all coil turns of such meter coil, for passing coil current when an overload is applied to the measuring coil part. The additional coil part has sufficient coil turns to assure that the action of increased overload current through the measuring coil part shall induce in the additional coil part a voltage which, together with the dynamically generated coil voltage, is in excess of the threshold voltage of its shunting diode, thereby producing in the diode circuit and in the additional coil part an opposite coil current and an opposing coil torque which reduces the coil speed to a low level at which coil damage by a coil stop is eliminated or made impossible. With the shunting diode rendered conductive by the so developed relatively high coil voltage of the additional coil part, the shunting diode will also divert part of the overload current from the measuring coil part.

FIGS. 1 and 1-A show, by way of example, one form of meter representative of this primary phase of the invention. Only the coil portions 20-6 and 20-7 having a relatively small number of coil turns between intermediate coil terminal 20-3 and coil end terminal 20-2, serve as the measuring coil part that is used for measuring current in the highest-sensitivity setting of the meter. As an example, all measuring coil turns of both coil portions 20-6 and 20-7 are used for current measurement with a full-scale current of 1 milliampere in the highest-sensitivity setting, and the coil turns of coil portion 20-7 only are used for current measurement in conjunction with a universal shunt resistance 64 in three successively lower sensitivity settings, for instance, of 3 milliamperes, 10 milliamperes and 30 milliamperes full-scale current.

In accordance with the invention, the meter coil 20 has in addition to the measuring portions 20-6, 20-7, which may have with a relatively small number of coil turns, an additional coil part 20-5 with a relatively large number of coil turns. A semi-conductor rectifier junction or diode 61 is connected in shunt directly across the opposite end terminals 20-1, 20-2 of all coil turns of the meter coil 20. With such coil arrangement and connections, an increasing overload current from the external measured circuit 60 through the measuring coil part 20-6, 20-7, or a portion thereof, will, by the high coil speed, induce a corresponding high coil voltage in the additional coil part 20-5. The additional coil part 20-5 has sufficient coil turns to assure that upon the application of an overload its induced voltage is in excess of the diode threshold voltage of shunting diode 61, and sufficiently higher for producing in the additional coil part and its diode circuit a relatively large damping current that is opposite to the increasing overload coil current of the measuring coil portions 20-6, 20-7, and for causing the resulting opposing coil torques to limit the maximum speed of the overloaded meter coil 20 to a relatively low level at which the meter coil 20 cannot be damaged through impact with a coil stop thereof, such as stops 51, 52.

The junction diode 61 may be one of the many generally available semi-conductor junction diodes having a very high resistance in forward direction at relatively low applied voltages such as developed across the meter coils of known current meters at full-scale currents. This high diode resistance prevents the shunting diode 61 from drawing any substantial current from the external measured circuit when the meter coil 20 is deflected by maximum measured direct current at a full-scale coil deflection, thereby assuring that the accuracy and sensitivity of the current measurement, as indicated on the meter scale 16, is not affected by the shunting diode 61.

Most generally used direct-current meters have a damping resistance connected in shunt across the meter coil to provide a near critical coil damping circuit which brings the meter coil to its proper indicating position and also to its two opposite deflection stops 51, 52 without annoying oscillations. Such coil damping circuit is designed so that the voltage generated in the deflected coil produces a damping current through the meter coil and the damping resistance which exerts on the coil the desired near critical damping torque in accordance with Lenz's law. In most cases, such shunt-connected damping resistance is a multiple of the coil resistance of the measuring coil turns. In a great many cases, such direct-current meters are designed for measuring currents with a full-scale coil deflection at a series of different sensitivity settings. To this end the damping resistance (also known as a "universal shunt") is usually connected across the meter coil, and a sensitivity switch serves to selectively connect the external circuit to be measured between a common terminal (to which one end of the damping resistance is connected) and one of the different taps of the damping resistance corresponding to the desired different sensitivity settings.

The form of the meter of the invention shown in FIGS. 1 and 1-A is of the type described in Greibach Patent 2,882,496, wherein the damping resistance is connected to only a relatively small number of the total coil turns of the meter coil that are used to measure current with a high-sensitivity setting, thereby assuring critical damping of the coil movement in each of a plurality of different sensitivity settings, with a critical damping resistance which has only a small fraction of a critical damping resistance connected across all coil turns of the meter coil.

The meter of FIGS. 1 and 1-A has a common meter terminal 63 which is connected through the suspension filament 25 to one end terminal 20-2 of the meter coil 20, and is marked with a plus sign to indicate that a corresponding lead from the external direct-current circuit 60 to be measured has to be connected thereto.

When the sensitivity switch 65 engages contact 1 in the highest-sensitivity setting, the measured circuit 60 sends the measured current through all coil turns of the measuring coil part consisting of the two coil portions 20-6 and 20-7. The positive meter terminal 63 and the corresponding end of shunting resistance 64 are connected through a lead from common meter terminal 63 and the suspension filament 26 to one coil end terminal 20-2 of meter coil 20. The opposite end of shunting resistance 64 is connected through suspension filament 26 to intermediate coil tap 20-4, thereby connecting the shunting resistance 64 in shunt to the coil turns of measuring coil portion 20-7. The sensitivity switch 65 has a movable switch connector element arranged to selectively connect the opposite-polarity lead of the external measured circuit 60 to any one of the associated switch contacts 1 to 5. Switch contact 1 of the sensitivity switch is connected through a lead including the opposite suspension filament 24 to coil tap 20-3, thereby making it possible to measure direct current with a highest-sensitivity setting at switch contact 1 of the sensitivity switch 65. Switch contacts 2, 3, 4 and 5 are connected to the negative end of shunting resistance 64 and to the different resistance taps 64-4, 64-5 and 64-6 of shunting resistance 64, and enable full-scale current measurements with four different successively lower sensitivity settings of switch 65 at switch contacts 2 to 5, respectively, with measured current passing only through coil portion 20–7 of meter coil 20. When the sensitivity switch 65 is in contact position 1, the external circuit 60 is connected between coil end terminal 20–2 and coil tap 20–3 passing the measured current only through the two coil portions 20–6, 20–7, and providing for full-scale current measurement with the highest sensitivity setting. With the sensitivity switch 65 in any one of the other contact positions 2, 3, 4 or 5, only coil portion 20–7 with the shunt resistance 64 connected across it, are used for measuring current with successively lower sensitivity settings.

The shunting diode 61 is fully effective in protecting the meter coil against damage by deflection shock under overload currents in each of the different sensitivity settings of a meter of the type shown in FIGS. 1 and 1–A corresponding, for instance, at each of the different contact settings 1–5 of sensitivity switch 65. As an example, it is assumed that an overload is suddenly applied by the external circuit 60 to meter coil 20 with the sensitivity switch 65 in contact setting 1, as seen in FIGS. 1 and 1–A. On the application of an overload, an increasing overload current, represented by the arrow $I_1$ in FIG. 1–A, will flow through both measuring coil portions, which produces a corresponding coil torque and initiates a coil deflection with a corresponding initial coil speed. Because of their velocity-field coupling, the increased overload current through measuring coil portions 20–6, 20–7 induces in the many turns of the additional coil part 20–5 a dynamic voltage exceeding the threshold voltage of the shunting diode.

The additional coil part 20–5 is provided with sufficient coil turns to assure that the dynamic voltage induced therein—by increasing overload current in measuring coil portions 20–6, 20–7, together with the therein dynamically generated voltage is sufficiently high for producing in the additional coil part 20–5 and its diode circuit a coil current $I_2$ which is opposite to overload coil current $I_1$, and cause the resulting opposing coil torques to limit the coil deflection speed to a low level at which danger of coil damage from impact with coil stops 51, 52 is eliminated and made impossible. In other words, although the overload coil current $I_1$ will exert a large coil torque in forward direction of the coil motion, the opposite transformer current $I_2$ flowing in coil turns 20–5 will exert an oppositely-directed coil torque, so that the meter coil will be subjected only to a relatively small resulting torque and will reach its stop 51 without excessive momentum and damage by impact engagement therewith. As a result, large coil impact shocks at the full-scale coil stop 51 are eliminated. As an example, sudden overloads of 10,000 times the normal full-scale current produce only a relatively slow movement of the meter coil 20, thus excluding the possibility of coil damage by coil impact against full-scale stop 51 under such very severe overloads.

If, as a result of such above-described slowing down of the coil movement, the voltage applied by the meter coil across the shunting diode 61 drops below the diode threshold voltage and stop diode current $I_2$, the immediately following coil-speed increase will again induce in the meter coil 20 across the diode 61 a coil voltage higher than the diode threshold voltage, thereby again producing in coil part 20–5 an opposing coil current $I_2$ so that the resulting opposing coil torques will again slow down the coil motion to the low level at which coil-stop damage is eliminated. It should be noted that when the shunting diode 61 is so rendered conductive by the dynamically induced coil voltage and the dynamically generated voltage, the circuit of the shunting diode 61 will divert a part of the overload current from the measuring coil portions 20–6, 20–7, thereby reducing coil strains and the danger of overheating the meter coil 20.

Although an appreciable part of the overload current is diverted to the shunting diode 61, the applied overload will also send through the measuring coil portions 20–6, 20–7 of meter coil 20 an increased overload current. The overload current-increase through the meter coil portions 20–6, 20–7 deflects the meter coil 20 against the full stop spring 51 and holds this stop spring 51 elastically deformed until the overload is removed (FIG. 1). Upon removal of the overload from the meter coil 20, the deflected full-scale stop spring 51 will be released, and its elastically stored energy will impart to the meter coil a high speed return movement toward the opposite or zero stop spring 52. This excessively accelerated return movement of the meter coil 20 will in turn produce excessive deformation of the zero stop spring 52, which in turn will throw the meter coil 20 back with excessive acceleration toward the full-scale stop spring 51. To prevent damage to the meter coil as a result of such excessively accelerated coil return movement, a further, generally similar semi-conductor rectifier junction or diode 62 is directly connected in reversed direction across the two coil end terminals 20–1, 20–2 to provide a low diode resistance for reversed current flow from the meter coil 20 when excessive return acceleration causes the meter coil to generate an excessive coil voltage larger than the diode threshold voltage, which reversed current flow applies a dynamic braking action to the meter coil 20 and prevents it from reaching the zero stop spring 52 with a momentum that might damage the coil.

The semi-conductor rectifier junctions or diodes 61 and 62 are of any of the available types. By way of example, in FIG. 5, graph 61–8 shows voltage-current characteristics, and graph 61–9 voltage-resistance characteristics of one type of available semi-conductor rectifier junction diode suitable for use as forward shunting diode 61 and as reverse shunting diode 62 for meters of the invention herein described. The current voltage graph 61–8 indicates for different applied diode voltages of .1 to .7 volt, the diode current in microamperes up to 1250 microamperes. The diode current is negligibly small for voltages below the diode threshold voltage of about 350 millivolts. The diode current increases rapidly at applied voltages in excess of .6 volt. The current-resistance graph 61–9 indicates the diode resistance in kilo-ohms for the different applied diode voltages. The diode resistance increases at an extremely high rate for applied voltages lower than the diode threshold voltage of 350 millivolts, corresponding to the steep rate of the resistance rise for the voltage decreasing from 380 to 350 millivolts.

When the voltage of the external measured current circuit 60 is applied through sensitivity switch 65, for instance through switch contact 1, to measuring coil portions 20–6, 20–7 of the meter coil, the measured current will flow only through these coil portions 20–6, 20–7. For all practical purposes, no current flows through the additional coil portion 20–5 of the meter coil 20, since the shunting diode 61 is essentially non-conductive at normal voltage drops across either one of the coil taps 20–3, 20–4 or coil terminals 20–1, 20–2 of meter coil 20. However, if an overload current is applied by the external circuit 60 through switch contact 1 and coil tap 20–3, two currents will flow through the meter coil 20. One of the two currents, represented by current arrow $I_1$ in FIG. 1–A flows through the measuring coil portions 20–6 and 20–7, and an oppositely directed current, represented by current arrow $I_2$ flows through the additional many-turn coil portion 20–5 of the meter coil in series with the shunting diode 61 which is connected across the entire meter coil 20. The additional coil portion 20–5 is designed to have sufficient coil turns to assure that through its velocity-field coupling with the measuring coil portions 20–6, 20–7, an increasing overload current $I_1$ will induce in the additional coil portion 20–5 a voltage higher than the threshold voltage of shunting diode 61. The so induced higher-than-diode threshold voltage of additional coil part 20–5 will cause it to pass an opposing coil current $I_2$ through the now conductive diode circuit thereby producing in the additional coil portion 20–5 and its diode circuit the opposite coil current $I_2$.

The above-described diode shunting circuit of additional coil portion 20–5 is designed to assure that while the coil current $I_1$ through measuring coil portions 20–6, 20–7 exerts on the meter coil a large torque in the forward direction of the coil deflection, the opposite coil current $I_2$ will impart through coil portion 20–5 to the meter coil 20 a relatively large oppositely directed torque, so that the difference between these opposing coil torques shall produce only a relatively small and harmless velocity of the meter coil 20. The shunt-connected diode 61 thus eliminates or minimizes the possibility of meter coil 20 reaching the full scale coil stop 51 with excessive velocity, and damage to the meter coil by stop shock. As an example, because of the just-described opposing coil torques, the normal full scale current applied to both measuring coil portions 20–6, 20–7, or only to measuring coil portion 20–7, will impart to the meter coil 20 only a relatively slow deflection, and the possibility of coil damage by coil stop 51 is excluded.

The strength of the magnetic field induced in the air gaps 11 of the magnetic core 10 within which the meter coil 20 is deflected, determines the number of coil turns required by the additional coil part 20–5 for inducing therein a voltage exceeding the diode-threshold voltage and producing counter-current $I_2$ which assures slow coil deflection under all overloads. It should be noted that— in addition to the above-described induced coil voltage— the increasing overload current through the measuring coil parts of coil portions 20–6, 20–7 will also produce an initial increase of coil deflection speed, which speed increase causes the meter coil 20 to generate a dynamic voltage across its end terminals 20–1, 20–2. Accordingly, it is sufficient that—on the application of an overload—the sum of the induced voltage generated in the meter coil 20 by the initial increase of the coil speed and of the coil-field induced voltage, shall develop across the coil end terminals 20–1, 20–2 a coil voltage which is higher than the threshold voltage of the shunting diode 61 and thereby produce the desired opposing coil current $I_2$ through additional coil part 20–5. For a given total number of coil turns of meter coil 20, the magnitude of the voltage which is dynamically generated across its end terminals 20–1, 20–2 by increasing coil speed, is likewise dependent on the induced magnetic field in air gap 11 of the magnetic core 10.

Depending on the strength of the induced air-gap magnetic field, the additional coil part 20–5 may require a larger or smaller number of additional coil turns for assuring that under an applied overload, the meter coil 20 will develop across its directly connected shunting diode 61 a coil voltage higher than the diode threshold voltage for producing in the additional coil part 20–5 a balancing current and corresponding balancing coil torque which opposes and sufficiently balances the overload-current coil torque, to assure slow coil deflection under severe overload conditions. In general, the desired overload-torque-balancing opposing coil current $I_2$ through the circuit of shunting diode 61 will be produced by making the additional coil part 20–5 with sufficient additional coil turns to assure that the initial coil speed increase caused by an applied overload will dynamically generate across the coil and terminals 20–1, 20–2 a relatively high coil voltage exceeding the diode threshold voltage, thereby providing a low resistance path for coil-speed-opposing induced current $I_2$ in the additional coil part 20–5 as described above. In other words, when the additional coil part 20–5 is given sufficient additional coil turns to assure that the initial increase of the coil-deflecting speed under an applied overload current $I_1$ shall dynamically generate in the total number of coil turns of the meter coil 20 a relatively high coil voltage in excess of the threshold voltage of the coil shunting diode 61—the coil turns of the additional coil part 20–5 and of the measuring coil part of meter coil 20 will also be proportioned to assure that their action will develop in the measuring coil part 20–5 a voltage exceeding the diode-threshold voltage and producing in the additional coil part 20–5 a counter-torque which results in a slow, harmless coil deflection.

In general, current meters of the type used in laboratories operate with air gap fields which requires that the additional coil portion 20–5 shall have sufficient coil turns to provide the entire meter coil 20 with at least about 800 to 1000 coil turns in order to assure that the meter coil 20 shall generate across its end terminals 20–1, 20–2 a raised coil voltage greater than the diode threshold voltage when the meter coil 20 is given increased initial speed by an applied overload. As an example, with the measuring coil parts 20–6, 20–7 having only 30 coil turns, the additionally serially-connected coil portion 20–5 is given 970 coil turns to provide the meter coil 20 with about 1000 coil turns for causing the initial overload speed increase of the meter coil 20 to develop across its end terminals 20–1, 20–2 a raised coil voltage in excess of the relatively low diode-threshold voltage at which the higher coil voltage will pass a large damping current which slows down the coil movement and assures that troublesome coil damage by the deflection stops 51, 52 is eliminated. As an example, whereas the damping shunt resistance, such as shunt resistance 64 of the meter connected directly to coil terminals 20–1 would be 500,000 ohms, the resistance of the shunting diode 61 at coil voltages exceeding the diode-threshold voltage is in most cases at most 100 ohms, which is equivalent to a short-circuit across the meter coil 20 and results in the flow of a large damping current through meter coil 20 and overdamping of the coil motion under large applied overloads.

In general, the meter coil of sensitive direct-current meters of the D'Arsonval type has connected thereto a critical damping resistance about 100 times greater than the coil resistance.

Figures 6, 7:
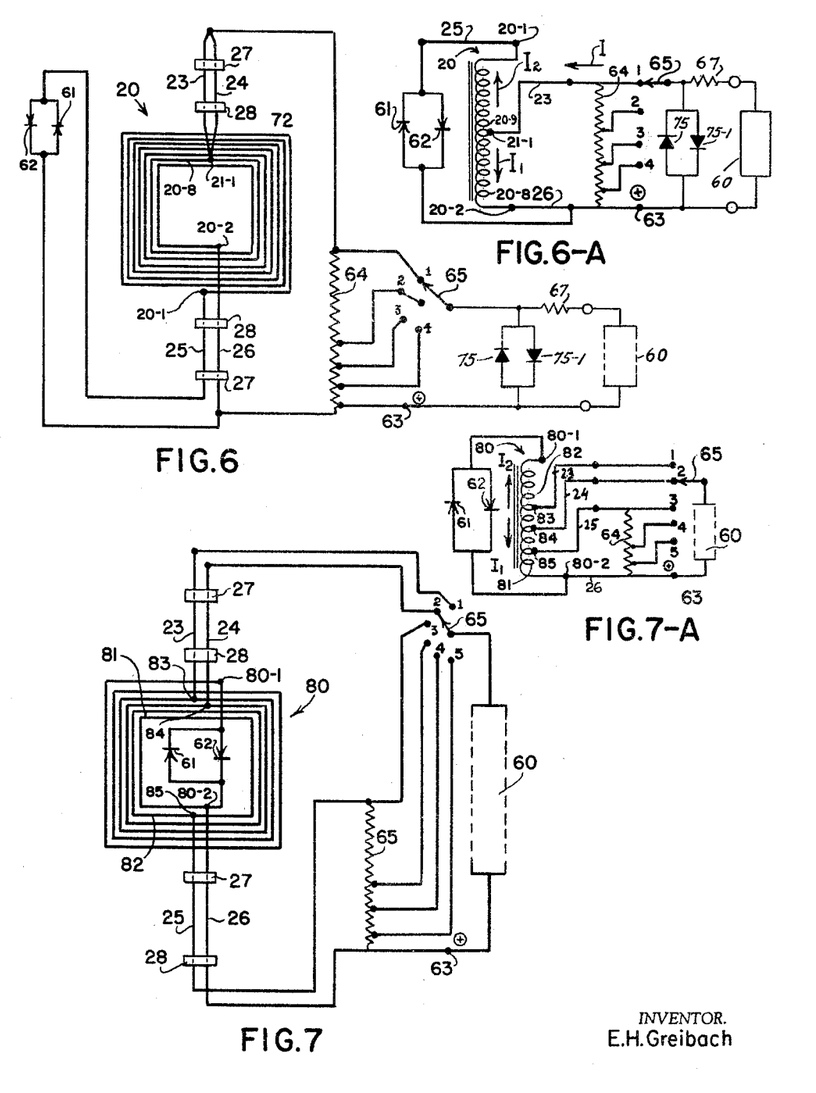
FIGURES 6 and 7 are diagrammatic views generally similar to that of FIGURE 1, exemplifying modified forms of measuring devices of the invention.

FIGS. 6 and 6–A show a modification of a meter of the type shown in FIGS. 1 and 1–A, operating, for instance, with a similar coil movement. For example, the meter of FIGS. 6 and 6–A may be a milliampere meter of the type described in page 13 of the 1959 Greibach catalogue, designed for measuring current with 50-milli-ampere full scale deflection in its high-sensitivity setting, with a measuring coil portion 20–8 having only about 30 turns of relatively heavy wire and a direct-current resistance of only 2 ohms. In accordance with the invention, the meter coil 20 of such meter has an additional coil portion 20–9 with a relatively large number of fine-wire coil turns which are serially connected with the measuring coil part 20–8, and a shunting diode 61 is connected in shunt across all coil turns of the meter coil, as in the meter of FIG. 1. The additional coil part 20–9 has sufficient coil turns to assure that increasing overload current in measuring coil part 20–8 induces in additional coil part 20–9 a relatively high voltage in excess of the diode threshold voltage, which produces an opposing coil current and coil torque in the additional coil part 20–9, so that the opposing coil torques shall keep the coil speed at a low level at which coil damage by the coil stops 51, 52 is impossible. The meter coil 20 of the meter of FIGS. 6, 6–A may be held suspended for deflection in an air gap of a magnetic core structure by pivot supports or by two sets of bifilary suspension elements 23, 24 and 25, 26, as described in connection with FIGS. 1–4. The meter coil 20 has an intermediate tap 21–1 which subdivides its large number of coil turns into the few-coil-turn measuring coil portion 20–8 and the many-coil-turn additional coil portion 20–9 designed as described above.

When a high overload voltage of the measured circuit 60 is applied to measuring coil portion 20–8 at switch contact 1 between coil tap 21–1 and coil end 20–2, a direct current overload indicated by arrow $I_1$ (in FIG.

6-A) will flow through measuring coil portion 20-8. As a result of the transformer action of the two coil portions 20-8, 20-9, and the initial overload speed-up of meter coil 20, it will generate across its end terminals 20-1, 20-2 and across the shunt-connected diode 61 a raised coil voltage exceeding the diode threshold voltage, which causes instantaneous diverted flow of the overload current $I_2$ through the additional coil portion 20-9 and the shunting diode 61, as indicated by current arrow $I_2$ in FIG. 6-A. In other words, an overload applied through switch 65 to coil tap 21-1 of measuring coil portion 20-8 produces in the two coil portions 20-8, 20-9 of the meter coil 20 opposing coil torques corresponding to the opposing coil currents $I_1$, $I_2$, as the instantaneously generated raised coil voltage diverts the overload current $I_2$ into the shunting diode, with the opposing coil torques producing only a relatively small and harmless speed of meter coil 20. A reversely poled supplemental rectifying junction diode 62 is connected parallel to the main shunting junction 61 to protect the meter coil 20 from damage through coil acceleration that might be imparted thereto when the deformed full-scale stop spring 51 is released from its deformed position by the removal of an overload, in a way similar to that described above in connection with diode 62 of the meter of FIGS. 1 and 1-A.

In general, depending on the current range of the meter, known rectifier junction diodes or generally similar rectifier junctions having a low resistance in their forward directions above a relatively low threshold voltage about six to two hundred times greater than the meter coil voltage at full-scale deflection current, are suitable for use as shunting junctions which operate in the manner described above for protecting the meter coil against stop-shock damage.

Whereas microammeters of very high sensitivity are able to withstand substantial static overloads remaining connected thereto without coil damage by overheating, for instance up to 100 and even up to 1000 times full-scale current, milliammeters or in general meters designed for measuring higher currents are readily damaged by overheating if an overload current such as twenty times maximum full-scale current is permitted to pass through the meter coil for some length of time which, depending on the meter, may range from several seconds to somewhat longer. In accordance with a phase of the present invention, as protection against such overheating damage, the rotatable meter coil has connected in a special way parallel to the current-measuring coil turns a semi-conductor rectifying junction which will not pass current under normal current-measuring conditions of the meter, but which will pass large current and reduce current flow through the measuring coil turns if such damage overload current is left connected to the meter coil. FIG. 6-A shows one exemplification of such protective arrangement.

A rectifying junction diode 75 of relatively high current capacity, such as one or more parallel-connected silicon diodes 75, is or are connected parallel to the measuring coil portion 20-8 of the meter coil 20. Silicon diode 75-1, connected parallel to and in reversed polarity with respect to diodes 75, is provided for reverse current protection. The parallel combination of diodes 75 and 75-1 is connected between meter terminal 63 and switch arm 65. Resistor 67 is connected in series between switch arm 65 and one terminal of external circuit 60 whose other terminal is connected to meter terminal 63. The value and function of resistor 67 is explained hereinafter in the description of FIG. 8.

The meter of FIGS. 6 and 6-A enables measurement of large currents with a high-sensitivity setting of sensitivity switch 65 at switch contact 1, wherein the external circuit 60 is connected across all the coil turns of the current-measuring coil portion 20-8 of meter coil 20 and across the entire shunt resistance 64 connected thereto. By moving the switch 65 to any one of the other switch contacts 2, 3, and 4, the external circuit 60 is connected to successive lower taps of the shunt resistance 64, so as to measure in a conventional way heavier currents with full-scale deflection of coil 20 in each of these different sensitivity-switch settings.

With the shunting diode 61 connected directly across the end terminals of the meter coil, an overload applied to measuring coil part 20-8 in any of the different settings of the sensitivity switch will produce opposing coil currents and coil torques in the different coil portions 20-8, 20-9 of the meter coil 20, thereby assuring a slow coil motion at which coil damage by coil stops 51, 52 is excluded.

There are cases wherein it is desirable to provide the measuring coil turns of a milliampere meter or in general a meter as described in connection with FIGS. 6 and 6-A, with an additional coil tap for measuring currents with an additional relatively high-sensitivity setting. FIGS. 7 and 7-A indicate diagrammatically how the rotatable meter coil of a so-modified meter, wherein the meter coil is rotatably carried by a bifilary coil suspension structure, may have connected across the meter coil a rectifying junction diode for protecting it against stop-shock damage under overload applied to the meter coil.

The meter of FIGS. 7 and 7-A has a meter coil 80 with two coil end terminals 80-1, 80-2 and a coil tap 83 which subdivides the meter coil 80 into a measuring coil part 81 with a relatively small number of coil turns, and an additional coil part 82 with a relatively large number of coil turns. Since the measuring coil part 81 has only a relatively small number of coil turns, the additional serially-connected coil part 82 is given a relatively large number of coil turns so that the rotatable meter coil 80 operates in a manner analogous to the serially-connected coil parts of the meter of FIGS. 6 and 6-A described above. The measuring coil part 81 extending between coil tap 83 and coil end 80-2 is subdivided into three serially-connected coil portions by two additional coil taps 84, 85. The meter coil 80 is held suspended within the air gap of the magnetic core structure by a similar bifilary suspension structure having two sets of tensioned, opposite pairs of relatively insulated suspension filaments 23, 24 and 25, 26, as in the meter of FIGS. 1-4. The inner ends of the two upper suspension filaments 23, 24 are shown connected to coil taps 83 and 84 of measuring coil portion 81. The inner ends of the two opposite suspension filaments 25, 26 are connected to coil tap 85 and to coil end 80-2 of the measuring coil part 81, which is also the coil end of the entire meter coil 80.

A damping or shunting resistance 64 is connected across the two filaments 25, 26 and therethrough to coil tap 85 and coil end 80-2 of the last coil portion of the three serially-connected coil portions of the measuring coil part 81. An external meter terminal 63 of positive polarity indicated by a plus symbol, is connected through filament 26 to coil end 80-2 of the measuring coil part 81. The external circuit 60 to be measured is selectively connected between the common meter terminal 63 and a movable switch connector of sensitivity switch 65 arranged to make contact with switch contacts 1 to 5. Switch contacts 1 to 3 of sensitivity switch 65 are connected, respectively, to the outer ends of suspension filaments 23, 24 and 25, for enabling current measurements with a full-scale coil deflection either with all coil turns of the measuring coil portion 81 in the highest sensitivity setting at switch contact 1, or with two successively smaller number of coil turns of coil taps 84 and 85 of the measuring coil part 82 in two successively lower sensitivity settings at switch contacts 2 and 3. Additional full-scale current measurements are made with two successively lower-sensitivity settings of sensitivity switch 65 in contact positions 4 and 5, through which the external circuit 60 is connected to successive taps of the shunt 64, as in the meter of FIG. 6-A.

In order to make it possible for the meter of the type shown in FIGS. 7 and 7-A to perform current measurements with the desired large number of different sensitivity settings, all four suspension filaments 23, 24, 25, 26 of its bifilary coil suspension are utilized for selectively connecting different measuring coil portions of the measuring coil part 81 to the external measured circuit 60 in the desired different sensitivity settings. In accordance with the invention, in such meter the shunting diode 61 and the oppositely poled supplemental diode 62, which have to be connected across all of the coil turns of meter coil 80, are carried by the rotatable meter coil 80 and are deflected with it. FIG. 7 shows diagrammatically how each of the shunting diodes 61, 62 has its opposite poles connected across the coil end terminals 80-1, 80-2 of meter coil 80, with the two diodes 61, 62 being rotatably carried together with rotatable meter coil 80 by the suspension filaments 23 to 26 of the bifilary coil suspension system, such as described above in detail in conneciton with FIGS. 2-4. Thus one terminal of each of the two diodes 61, 62 is connected to coil end 80-1, and the opposite terminal of each diode 61, 62 is connected to the coil end 80-2 of the entire meter coil 80 as it is carried on the four coil suspension filaments 23 to 26.

Where the rectifying junction diodes, such as diodes 61 and 62, have to be carried by the rotatable meter coil, as by the rotatable meter coil 80 of FIGS. 7 and 7-A, care must be taken to assure that the conducting terminal leads of such junction diodes are free of all traces of magnetic material, in order to prevent distortion or disturbances of the magnetic field and its action in deflecting the meter coil and making the current measurements with the required accuracy and sensitivity.

With the sensitivity switch 65 at switch contact 1, all coil turns of the measuring coil part 81 are connected to the external circuit 60 for measuring current at the highest sensitivity setting with a full-scale deflection. With the sensitivity switch 65 in either switch contact position 2 or 3, the meter coil 80 will perform full-scale current measurement in two successively lower sensitivity settings with two successively smaller number of coil turns of measuring coil part 81 extending between coil taps 82, 83 and 84, respectively. Additional full-scale current measurements are made in each of several successively lower sensitivity settings of the sensitivity switch 65 at contacts 4 and 5, wherein the external measured circuit 60 is connected to successive different resistance taps of shunting resistance 64, as in the meter of FIG. 1.

In accordance with a broader phase of the invention—which is based on the primary phase of the invention explained above in connection with the meters of FIGS. 1 to 7-A—high-sensitivity current meters which require meter coils having a large number of measuring coil turns, such as 800 to 1000 coil turns or more, have a semi-conductor rectifying junction or diode directly connected across the end terminals of such meter coil. Advantage is taken of the fact that in the initial speed increase under an applied overload, the many coil turns of such meter coil will dynamically generate across the direct-connected shunting diode a relatively high coil voltage in excess of the diode threshold voltage at which its low diode resistance passes a heavy coil-damping-current which over-damps the coil motion and assures relatively low coil speed at which it will not be damaged by the coil stops.

Figure 8:
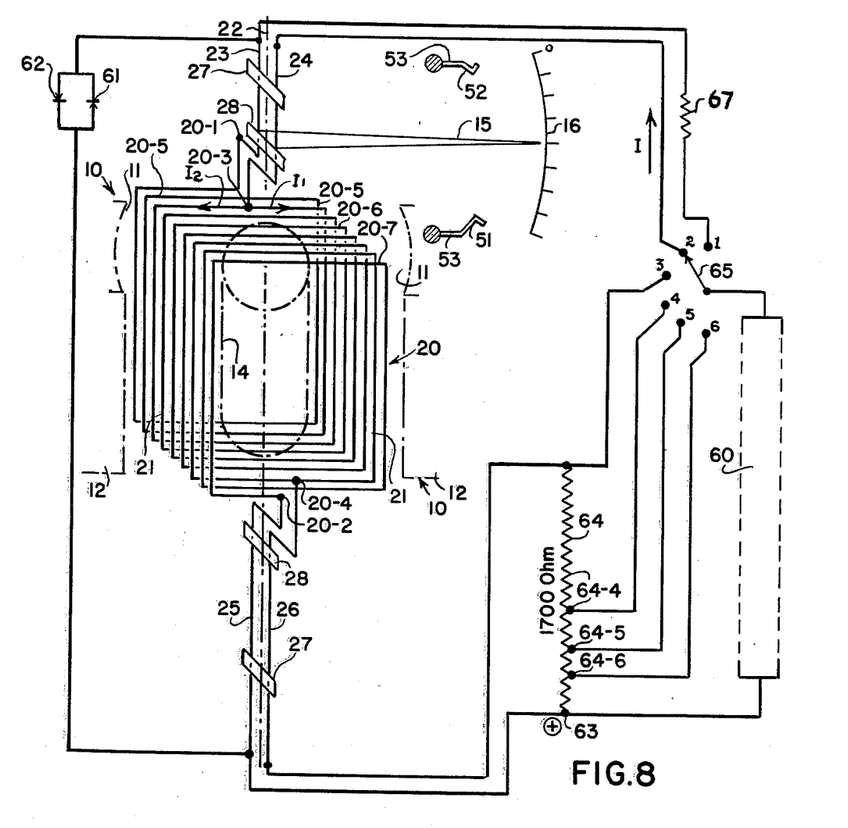
FIGURES 8 and 8-A are diagrammatic views similar to FIGURES 1 and 1-A of a modified form of a meter of the invention.

FIGS. 8 and 8-A show an example of a high-sensitivity meter representative of this broader phase of the invention. The meter movement of FIGS. 8 and 8-A is shown to be identical with that described above in connection with FIGS. 1 and 1-A, except for the differences described below. In the meter of FIGS. 8 and 8-A, all coil turns including coil portion 20-5 of meter coil 20 are arranged to be connected to the external measured circuit 60 in the highest sensitivity setting of sensitivity switch 65 and switch contact 1 thereof. The sensitivity switch 65 of FIGS. 8 and 8-A has in addition to the high-sensitivity contact 1, five additional lower-sensitivity contacts corresponding to switch contacts 1 to 5 of the similar sensitivity switch 65 in FIGS. 1 and 1-A, for performing current measurements with the five sensitivity settings as there described.

With the sensitivity switch 65 of FIGS. 8 and 8-A in the high-sensitivity setting at switch contact 1, the current to be measured flows from external circuit 60 through positive meter terminal 63 and suspension filament 25 to coil end-terminal 20-2, and after passing all coil turns of meter coil 20, it flows from opposite coil end-terminal 20-1, through suspension filament 23 and therefrom through a lead including a relatively small series resistance 67 and selector switch 65 at contact 1, back to external circuit 60. The critical damping shunt resistance 64 which is connected across coil portion 20-8 of meter coil 20 is reflected as a much higher effective damping resistance across the end terminals 20-1, 20-2 of all current measuring coil turns of meter coil 20. Otherwise, the meter of FIGS. 8 and 8-A is identical with that of FIGS. 1 and 1-A.

In accordance with the broader phase of the invention, the meter coil 20 of a meter of the type shown in FIGS. 8 and 8-A, has a sufficiently large number of coil turns to assure that the initial coil speed increase produced by an applied overload, will cause the many-turn meter coil 20 to dynamically generate across its coil end terminals 20-1, 20-2 and its shunting diode 61, a relatively high coil voltage in excess of the diode threshold voltage. At the high coil voltage so generated across the shunting diode 61, by the overload-caused increased initial coil speed, the shunting diode will present to the meter coil only a very low resistance, and it will pass a relatively heavy damping current from the meter coil which over-damps and slows down the motion of meter coil 20 under large applied overload and prevents coil damage by impact with the coil stops 51, 52, as set forth hereinbefore. In all other sensitivity settings of the meter, at switch contacts 2 to 6 of FIGS. 8 and 8-A, the required slow coil speed under overload is assured in the manner explained in connection with the meter of FIGS. 1 and 1-A with corresponding settings 1 to 5 of the sensitivity switch 65.

Without thereby limiting in any way the scope of the invention, but in order to enable more ready practice thereof, there will now be given more detailed data of commercial meters of the invention, such as described on page 12 of the 1959 catalogue of the Greibach Instruments Corp., under the heading "D.C. Microammeters," and in connection with FIGS. 8 and 8-A. Assuming a meter without additional taps on the shunt damping resistance 64 and having only three different sensitivity settings, it has highest sensitivity setting with a full-scale current reading of 1 microampere at switch contact 1; a next-lower sensitivity setting with a full-scale current reading of 3 microamperes at switch contact 2; and a next-lower sensitivity setting with a full-scale current reading of 10 microamperes at switch contact 3. The meter coil 20 has about 2200 coil turns with all coil turns having a total resistance of about 4700 ohms between the two coil end terminals 20-1, 20-2, with the two coil portions 20-6 and 20-4 having one-third, and coil portion 20-4 one-tenth of the coil turns and coil resistance of the entire coil. The coil turn having a resistance of 1600 ohms at the next-lower sensitivity setting at switch contact 2 and 480 ohms at the next-lower sensitivity setting at switch contact 3. A shunt damping resistance of about 5000 ohms is connected across coil portion 20-4 which has only one-tenth of the coil turns of meter coil 20, and it is equivalent to a shunt damping resistance of 500,000 ohms connected across coil end terminals 20-1, 20-2. This meter may be operated with full-scale coil deflection and with additional lower-sensitivity settings by providing the shunt resistance 64 with additional resistance taps connected to additional contacts, such as contacts 4, 5 and 6 of the sensitivity switch 65.

With the voltage of the measured external current circuit 60 connected to switch contact 1 in the highest sensitivity setting, the measured current will develop across the coil a voltage of only 4.7 millivolts. Such meter can take overloads up to 10 times and even up to 1000 times normal current without excessive coil shock and without damage to the coil by overheating. The application of an overload current 100 times full-scale current will impart to the meter coil 20 an initial high coil speed at which its many coil turns will generate across the coil terminals 20-1, 20-2 a relatively high dynamic coil voltage in excess of 500 millivolts, at which high coil voltage the shunt diode 61 has a negligibly low resistance and passes a large damping current from the meter coil 20, thus over-damping and slowing down the coil deflection and preventing coil damage by the coil stops 51, 52. To prevent damage to the shunting diode 61 by an excess overload current applied thereto in the highest sensitivity setting at switch contact 1, the lead from switch contact 1 to coil end terminal 20-1 includes a serially connected impedance 67 of a negligibly low resistance compared to the D.-C. resistance of the meter coil 20, which has no effect on the accuracy and the sensitivity of the meter in the highest sensitivity setting.

Figure 5:
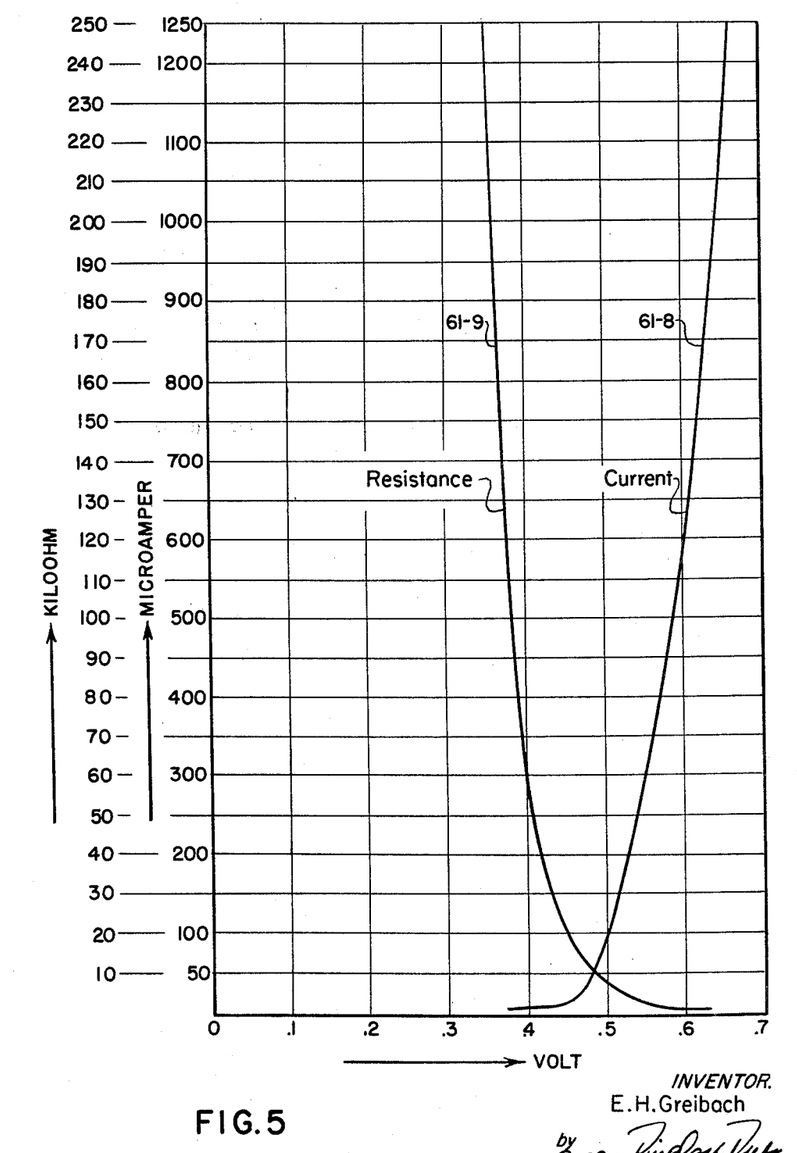
FIGURE 5 contains characteristic voltage-current and voltage-resistance graphs of one example of a semi-conductor rectifier junction or diode suitable for a measuring device of the invention.

As an example, with a meter of the invention having a shunting diode 61 with the operating characteristics shown in the graphs of FIG. 5, the series impedance 67 may consist of a resistance of only 50 to 100 ohms, which is negligible compared to the total resistance of 4700 ohms of all coil turns of meter coil 20 in such high-sensitivity setting. As indicated by the graph 61-9 in FIG. 5, at meter coil voltages less than 100 millivolts, the shunt diode 61 will have a forward resistance of at least one megohm, and it will divert only negligible current from the meter coil and have no effect on the sensitivity and rated accuracy of the meter.

Even under a relatively low overload, such as 100 times full-scale current applied to current meters of the invention such as described above in connection with FIGS. 8 and 8-A, the initial increasing coil speed will generate across meter coil 20 a raised coil voltage of about 480 millivolts. In such meter, the critical damping resistance which is effective across all coil turns of the meter coil 20 is about ½ to 1 megohm, while the effective resistance of shunting diode 61 is relatively very low at such raised coil voltage of 480 millivolts. Accordingly, this shunting diode 61 severely damps the deflection of the meter coil 20 under overloads and reduces the coil speed to a level which prevents coil-stop damage. In fact, the effective damping action of shunting diode 61 which prevents excess coil speed, starts at relatively low overloads, such as 10 to 20 times full-scale current.

In some cases, where an applied overload cannot be quickly removed, one or more additional diodes, such as diode 61-1 in FIG. 1-A, may be connected parallel to overload by-passing diode 61 described above, so that the by-passed overload current will pass in parallel through the several parallel-connected by-pass diodes.

Under all such overloads, the supplemental diode 62 which is connected with reversed-forward direction across the coil end terminals, will pass braking currents which brake excessive coil acceleration imparted to the meter coil by stored energy of the deformed stop spring 51 upon removal of the overload.

It will be apparent to those skilled in the art that the novel principles of the invention disclosed herein in connection with specific exemplifications thereof, will suggest various other modifications and applications of the same. It is accordingly desired that in construing the breadth of the appended claims they shall not be limited to the specific exemplifications of the invention described above.

I claim:

1. In a direct-current measuring device having a magnetic structure with a relatively strong induced magnetic air-gap field, a rotatable coil having a relatively large number of coil turns passing through said gap field for producing a full-scale coil deflection between the full-scale deflection limit and the opposite deflection limit of a deflection range of said coil corresponding to measured coil current, a full-scale stop element engaged by and stopping said coil at the full-scale coil deflection limit of said deflection range, said coil having at least one measuring coil part serially connected with at least one additional coil part, and connector means for connecting an external measured circuit to said measuring coil part and thereby cause said coil to move over its full deflection range at a predetermined full-scale current through said measuring coil part, and a semi-conductor rectifier junction connected in shunt across said large number of coil turns to pass forward current parallel to the measured coil current, said junction having a very high forward resistance below a predetermined threshold voltage and a low forward resistance for passing relatively large current under applied voltage exceeding said threshold voltage, said additional coil part having sufficient coil turns for causing the action of overload current through said measuring coil part to generate in said additional coil part a voltage at which a coil voltage exceeding said threshold voltage is developed across said junction for producing in said additional coil part an opposing coil current and opposing coil torques in said coil parts and thereby minimizing excessive coil speed and coil damage.

2. In a measuring device as claimed in claim 1, said coil having sufficient coil turns for generating across said junction a coil voltage exceeding said junction threshold voltage in the initial coil-speed increase under an applied overload, and causing said coil to pass a relatively large damping current through said junction and thereby minimize excessive coil speed and coil damage.

3. In a measuring device as claimed in claim 1, two sets of metallic filaments mutually insulated from each other and extending, respectively, from two opposite transverse coil sides of said coil and constituting the sole rotatable support of said coil, said coil having a plurality of coil taps subdividing said coil into a plurality of coil portions, said measuring coil part being connected through one coil tap to said additional coil part and having three serially connected measuring coil portions with two coil taps between them, one of said filaments being connected between one pole side of the external circuit and the coil end terminal at the outer end of the measuring coil part, the inner ends of the three other of said filaments being connected to said coil taps of said measuring coil part, and connector means including means for connecting the opposite pole of the external circuit to any one of the outer ends of said three other filaments and thereby selectively measure external current at different sensitivities with one of three different numbers of coil turns of said measuring coil part, said junction being carried together with said coil by said two sets of filaments.

4. In a measuring device as claimed in claim 3, a shunt resistance connected across at least one coil portion of said measuring coil part having less coil turns than the entire coil, and connector means for selectively connecting an external measured circuit in a higher sensitivity connector setting across said measuring coil part and in at least one other lower sensitivity connector setting to said shunt resistance and causing said coil to move over its full-scale deflection range at full-scale measured current in each of said connector settings, whereby an overload applied through said connector means to said measuring coil portion in said one lower setting will induce in coil parts other than the coil turns of said measuring coil portion a voltage producing in said additional coil part an opposing coil current and opposing coil torque which counteract the overload current and its overload coil torque.

5. In a measuring device as claimed in claim 4, said measuring coil part being designed to pass relatively large overload currents up to at least twenty times maximum full-scale current for only a short instant of the order of at least about one-third of a second but being dangerously overheated by prolonged overload currents, and a semi-conductor by-pass rectifying junction connected across said measuring coil part to pass forward current parallel to the measured current and having a very high forward by-pass resistance of the order of at least half a megohm below its by-pass junction threshold voltage of at least about three times the voltage developed across said measuring coil part at full-scale current deflection with said by-pass resistance dropping rapidly above the threshold voltage of said by-pass junction, whereby upon dangerous overload current developing across said measuring coil part a voltage drop greater than said by-pass threshold voltage will be by-passed through said by-pass junction.

6. In a measuring device as claimed in claim 1, a shunt resistance connected across at least one coil portion of said measuring coil part, and connector means for selectively connecting an external measured circuit in a higher sensitivity connector setting across said coil measuring part and in at least one other lower sensitivity connector setting to said shunt resistance and causing said coil to move over its full-scale deflection range at full-scale measured current in each of said connector settings, whereby an overload applied through said connector means to said measuring coil portion in said one lower setting will induce in coil parts other than the coil turns of said measuring coil portion a voltage producing in said additional coil part an opposing coil current and opposing coil torque which counteract the overload current and its overload coil torque.

7. In a measuring device as claimed in claim 1, said measuring coil part being designed to pass relatively large overload currents up to at least twenty times maximum full-scale current for only a short instant of the order of at least about one-third of a second but being dangerously overheated by prolonged overload currents, and a semi-conductor by-pass rectifying junction connected across said measuring coil part to pass forward current parallel to the measured current and having a very high forward by-pass resistance of the order of at least half a megohm below its by-pass junction threshold voltage of at least about three times the voltage developed across said measuring coil part at full-scale current deflection with said by-pass resistance dropping rapidly above the threshold voltage of said by-pass junction, whereby upon dangerous overload current developing across said measuring coil part a voltage drop greater than said by-pass threshold voltage will be by-passed through said by-pass junction.

8. In a direct-current measuring device having a magnetic structure with a relatively strong induced magnetic air-gap field, a rotatable coil having a relatively large number of coil turns passing through said gap field for producing a full-scale coil deflection between the full-scale deflection limit and the opposite deflection limit of a deflection range of said coil corresponding to a measured coil current, a full-scale stop element and an opposite stop element engaged by and stopping said coil at the full-scale coil deflection limit and the opposite deflection limit of said deflection range, said coil having a measuring coil part serially connected with at least one additional coil part, and connector means for connecting an external measured circuit to said measuring coil part and thereby cause said coil to move over its full deflection range at a predetermined full-scale current passing through said measuring coil part, and one semi-conductor rectifier shunting junction connected in shunt directly across said large number of coil turns to pass forward current parallel to the measured coil current, said semi-conductor junction having a very high forward resistance below a predetermined threshold voltage and a low forward resistance for passing relatively large current under applied voltage exceeding said threshold voltage, said additional coil part having sufficient coil turns for causing the action of overload current through said measuring coil part to generate in said additional coil part a voltage at which a coil voltage exceeding said threshold voltage is developed across said junction for producing in said additional coil part an opposing coil current and opposing coil torques in said coil parts and thereby minimizing excessive coil speed and coil damage, and a similar other semi-conductor rectifier junction connected across said large number of coil turns to pass forward current through said coil in a direction opposite to the measured current at voltages exceeding the junction threshold voltage for causing dangerous speed increase in the return motion of said coil by the deformed full-scale stop to generate in said coil across said other junction a voltage exceeding the threshold voltage of said other junction and producing a flow of braking current through said coil and said other junction and thereby dynamically braking the return motion of said coil parts and minimizing excessive coil speed and coil damage.

9. In a measuring device as claimed in claim 8, two sets of metallic filaments mutually insulated from each other and extending, respectively, from two opposite transverse coil sides of said coil and constituting the sole rotatable support of said coil, said coil having a plurality of coil taps subdividing said coil into a plurality of coil portions, said measuring coil part being connected through one coil tap to said additional coil part and having three serially connected measuring coil portions with two coil taps between them, one of said filaments being connected between one pole side of the external circuit and the coil end terminal at the outer end of the measuring coil part, the inner ends of the three other of said filaments being connected to said coil taps of said measuring coil part, and connector means including means for connecting the opposite pole of the external circuit to any one of the outer ends of said three other filaments and thereby selectively measure external current at different sensitives with one of three different numbers of coil turns of said measuring coil part, said two junctions being carried together with said coil by said two sets of filaments.

10. In a measuring device as claimed in claim 9, a shunt resistance connected across at least one coil portion of said measuring coil part having less coil turns than the entire coil, and connector means for selectively connecting an external measured circuit in a higher sensitivity connector setting across said measuring coil part and in at least one other lower sensitivity connector setting to said shunt resistance and causing said coil to move over its full-scale deflection range at full-scale measured current in each of said connector settings, whereby an overload applied through said connector means to said measuring coil portion in said one lower setting will induce in coil parts other than the coil turns of said measuring coil portion a voltage producing in said additional coil part an opposing coil current and opposing coil torque which counteract the overload current and its overload coil torque.

11. In a measuring device as claimed in claim 10, said measuring coil part being designed to pass relatively large overload currents up to at least twenty times maximum full-scale current for only a short instant of the order of at least about one-third of a second but being dangerously overheated by prolonged overload currents, and a semiconductor by-pass rectifying junction connected across said measuring coil part to pass forward current parallel to the measured current and having a very high forward by-pass resistance of the order of at least half a megohm below its by-pass junction threshold voltage of at least about three times the voltage developed across said measuring coil part at full-scale current deflection with said by-pass resistance dropping rapidly above the threshold voltage of said by-pass junction, whereby upon dangerous overload current developing across said measuring coil part a voltage drop greater than said by-pass threshold voltage will be by-passed through said by-pass junction.

12. In a measuring device as claimed in claim 8, a shunt resistance connected across at least one coil portion of said measuring coil part, and connector means for selectively connecting an external measured circuit in a higher sensitivity connector setting across said measuring coil part and in at least one other lower sensitivity connector setting to said shunt resistance and causing said coil to move over its full-scale deflection range at full-scale measured current in each of said connector settings, whereby an overload applied through said connector means to said measuring coil portion in said one lower setting will induce in coil parts other than the coil turns of said measuring coil portion a voltage producing in said additional coil part an opposing coil current and opposing coil torque which counteract the overload current and its overload coil torque.

13. In a measuring device as claimed in claim 8, said measuring coil part being designed to pass relatively large overload currents up to at least twenty times maximum full-scale current for only a short instant of the order of at least about one-third of a second but being dangerously overheated by prolonged overload currents, and a semiconductor by-pass rectifying junction connected across said measuring coil part to pass forward current parallel to the measured current and having a very high forward by-pass resistance of the order of at least half a megohm below its by-pass junction threshold voltage of at least about three times the voltage developed across said measuring coil part at full-scale current deflection with said by-pass resistance dropping rapidly above the threshold voltage of said by-pass junction, whereby upon dangerous overload current developing across said measuring coil part a voltage drop greater than said by-pass threshold voltage will be by-passed through said by-pass junction.

References Cited by the Examiner
UNITED STATES PATENTS

| | | | |
|---|---|---|---|
| 2,584,800 | 2/52 | Grisdale | 324—110 |
| 2,882,496 | 4/59 | Greibach | 324—115 |
| 2,919,407 | 12/59 | Sundt | 324—110 |

WALTER L. CARLSON, *Primary Examiner.*

BENNETT G. MILLER, *Examiner.*